(12) United States Patent
Vance et al.

(10) Patent No.: US 6,803,015 B2
(45) Date of Patent: Oct. 12, 2004

(54) METHOD OF MAKING WALL-FLOW MONOLITH FILTER

(75) Inventors: Fredrick W. Vance, Midland, MI (US); Sten A. Wallin, Midland, MI (US)

(73) Assignee: Dow Global Technologies Inc., Midland, MI (US)

(*) Notice: Subject to any disclaimer, the term of this patent is extended or adjusted under 35 U.S.C. 154(b) by 19 days.

(21) Appl. No.: 10/131,652

(22) Filed: Apr. 23, 2002

(65) Prior Publication Data
US 2002/0175451 A1 Nov. 28, 2002

Related U.S. Application Data

(60) Provisional application No. 60/285,809, filed on Apr. 23, 2001.

(51) Int. Cl.[7] .............................................. C04B 33/32
(52) U.S. Cl. ...................................... 264/628; 264/630
(58) Field of Search ................................. 264/628, 630, 264/631, 643

(56) References Cited

U.S. PATENT DOCUMENTS

| | | | |
|---|---|---|---|
| 4,041,591 A | 8/1977 | Noll et al. .................. 29/157.3 |
| 4,200,604 A | * 4/1980 | Dziedzic et al. ............ 264/101 |
| 4,276,071 A | 6/1981 | Outland ........................ 55/523 |
| 4,293,357 A | 10/1981 | Higuchi et al. ............... 156/89 |
| 4,340,403 A | 7/1982 | Higuchi et al. ............... 55/523 |
| 4,364,760 A | 12/1982 | Higuchi et al. ............... 55/523 |
| 4,364,761 A | 12/1982 | Berg et al. .................... 55/523 |
| 4,403,008 A | 9/1983 | Factor ......................... 428/117 |
| 4,411,856 A | 10/1983 | Montierth .................... 264/267 |
| 4,417,908 A | 11/1983 | Pitcher, Jr. ................... 55/523 |
| 4,420,316 A | 12/1983 | Frost et al. .................... 55/523 |
| 4,423,090 A | * 12/1983 | Hammond et al. .......... 427/181 |
| 4,427,728 A | 1/1984 | Belmonte et al. ........... 428/117 |
| 4,432,918 A | 2/1984 | Paisley ......................... 264/43 |
| 4,455,180 A | 6/1984 | Hillman et al. ............... 156/89 |
| 4,509,966 A | 4/1985 | Dimick et al. ................ 55/502 |
| 4,522,668 A | 6/1985 | Ogawa et al. ................ 158/89 |
| 4,557,773 A | 12/1985 | Bonzo ........................... 156/64 |
| 4,557,962 A | 12/1985 | Belmonte et al. ........... 428/117 |
| 4,559,193 A | 12/1985 | Ogawa et al. ................ 264/60 |
| 4,573,896 A | 3/1986 | Bonzo ......................... 425/125 |
| 4,643,749 A | 2/1987 | Miura ........................... 55/523 |
| 4,682,911 A | 7/1987 | Moreland ..................... 55/282 |
| 4,759,892 A | 7/1988 | Bonzo ......................... 264/251 |
| 5,021,204 A | 6/1991 | Frost et al. .................... 264/60 |
| 5,062,911 A | 11/1991 | Hampton et al. ............. 156/89 |
| 5,194,078 A | 3/1993 | Yonemura et al. ............ 55/466 |
| 5,198,007 A | 3/1993 | Moyer et al. ................. 55/523 |
| 5,332,703 A | 7/1994 | Hickman ..................... 501/119 |

(List continued on next page.)

FOREIGN PATENT DOCUMENTS

| | | |
|---|---|---|
| JP | 09-220423 | 8/1997 |
| WO | WO 94/22556 | 10/1994 |

OTHER PUBLICATIONS

Rejection dated Sep. 10, 2003 for United States Application 10/131,670 filed Apr. 23, 2002 (Dow Reference: 61193A).

Primary Examiner—Peter Chin
Assistant Examiner—Carlos Lopez

(57) ABSTRACT

A ceramic honeycomb wall-flow filter is prepared by plugging channels in a ceramic honeycomb by a method comprising the following. First, a mixture comprised of a dispersing liquid and ceramic powder is formed. Next, the mixture is inserted on one end of the channel in an unplugged ceramic honeycomb such that the mixture flows to the other end where the mixture collects and forms a plugged ceramic honeycomb. Then, the plugged ceramic honeycomb is heated to a temperature sufficient to sinter the plugged ceramic honeycomb to form a porous sintered plugged ceramic honeycomb.

18 Claims, 2 Drawing Sheets

U.S. PATENT DOCUMENTS

| | | | |
|---|---|---|---|
| 5,364,573 A | 11/1994 | Noky | 264/40.1 |
| 5,433,904 A | 7/1995 | Noky | 264/40.1 |
| 5,720,787 A | 2/1998 | Kasai et al. | 55/282 |
| 5,766,393 A | 6/1998 | Nishimura et al. | 156/89 |
| 5,846,276 A | 12/1998 | Nagai et al. | 55/523 |
| 6,200,483 B1 * | 3/2001 | Cutler et al. | 210/685 |
| 6,206,944 B1 * | 3/2001 | Hickman | 55/523 |
| 6,251,473 B1 * | 6/2001 | Wang et al. | 427/126.3 |
| 2002/0066982 A1 | 6/2002 | Yamaguchi et al. | 264/631 |
| 2002/0135107 A1 | 9/2002 | Nishi et al | 264/630 |
| 2002/0175451 A1 | 11/2002 | Vance et al. | 264/631 |
| 2003/0024220 A1 | 2/2003 | Ishihara et al. | 55/523 |
| 2003/0161945 A1 | 8/2003 | Allen et al. | 427/230 |

\* cited by examiner

METHOD OF MAKING WALL-FLOW MONOLITH FILTER

CROSS-REFERENCE TO RELATED APPLICATION

This application claims the benefit of U.S. Provisional Application Serial No. 60/285,809, filed Apr. 23, 2001.

FIELD OF THE INVENTION

The invention relates to ceramic wall-flow filters and methods of making them. In particular, the invention relates to particulate traps, such as diesel particulate traps.

BACKGROUND OF THE INVENTION

As air quality standards become more stringent, considerable efforts have focused on minimizing the particulate matter emitted in diesel engine exhaust. A potential solution is a particulate trap inserted in the exhaust system of a diesel engine.

A honeycomb ceramic wall-flow through filter, such as described in U.S. Pat. No. 4,276,071, has become the preferred type of particulate trap. These honeycomb filters are made by extruding a paste comprised of water, binder and ceramic powders (e.g., clay, mullite, silica, silicon carbide and alumina) that form, for example, cordierite upon firing. Clays or water soluble binders are generally used to make the paste sufficiently plastic to form useable honeycombs. After the paste is extruded, the honeycomb is dried, debindered and sintered to form a honeycomb. The honeycomb is sintered, typically, to give sufficient strength to the thin channel walls to survive insertion of a ceramic paste to plug the channels, as described next.

Finally, to make the wall-flow particulate trap or filter, one half of the openings of one end of the sintered honeycomb are plugged with a paste comprised of a suitable powder, dispersion medium and binder. Then, on the other end, the channels not already plugged are plugged with the paste. Subsequently, the plugged honeycomb is sintered again to form the wall-flow particulate trap.

Unfortunately, this method suffers from a number of problems. For example, the liquid in the paste may be drawn into the porous walls of the fired honeycomb preferentially causing non-uniform drying shrinkage of the plug and ultimately cracks in the plug. A second problem is the necessity for multiple expensive steps (e.g., at least two high temperature firings) to manufacture the particulate trap. These multiple steps are typically needed because the walls of a green ceramic honeycomb are thin and fragile they tend to deform and/or break when inserting the paste, which is particularly true when using a large scale process. Another problem is the limited compositions that may be used for the plug, due to the expansion of the fired honeycomb during the sintering shrinkage of the plug.

Accordingly, it would be desirable to provide a method for making wall-flow traps, for example, that avoids one or more of the problems of the prior art, such as one of those described above.

SUMMARY OF THE INVENTION

The invention is a method of plugging channels in a ceramic honeycomb comprising:

(a) forming a mixture comprised of a dispersing liquid and ceramic powder, (b) inserting the mixture at one end of the channel in an unplugged ceramic honeycomb, such that the mixture flows to the other end where the mixture collects and forms a plugged ceramic honeycomb and (c) heating the plugged ceramic honeycomb to a temperature sufficient to sinter the plugged ceramic honeycomb to form a porous sintered plugged ceramic honeycomb.

The method is particularly useful, but not limited to, plugging of channels in honeycomb wall-flow filters. Surprisingly, these methods may be used to not only plug the channels, but also simultaneously provide a discriminating layer, for example, on the walls of the outlet channels of a ceramic honeycomb wall-flow filter. The method may also be used to provide other useful materials on or in the walls of the filter (e.g., a catalyst or nucleation agent) of a channel, while simultaneously forming the plugs.

Figure 1:
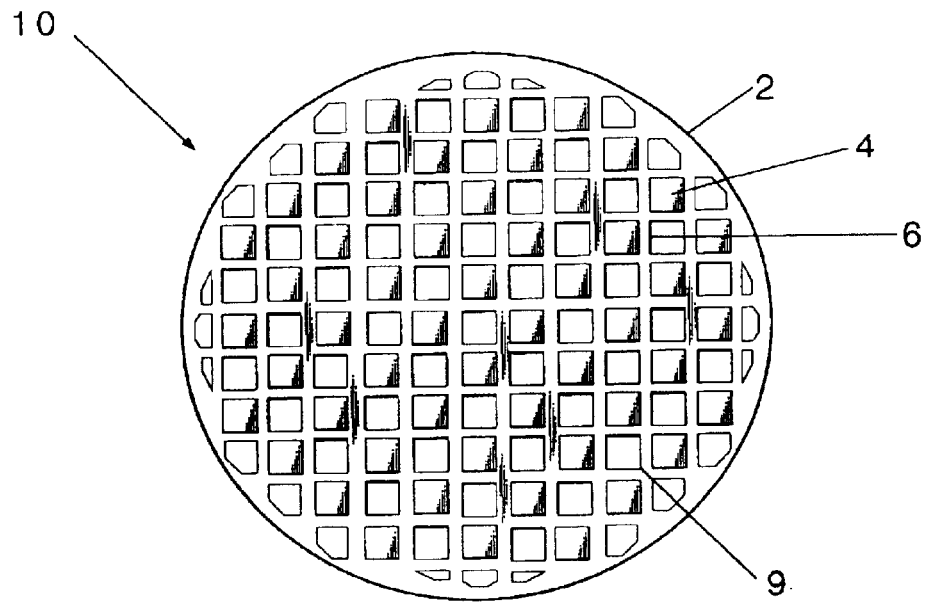
FIG. 1 is a front view showing one embodiment of a ceramic honeycomb filter made according to the present invention.

Throughout the different views of the drawings, numeral 2 is a ceramic honeycomb body, numeral 4 is an inlet channel, numeral 5 is an outlet channel, numeral 6 is a partition wall between adjacent channels, numeral 8 is an inlet plug, numeral 9 is an outlet plug, numeral 10 is an inlet end, numeral 11 is an outlet end and numeral 12 is a discriminating layer.

Definitions

Unplugged Ceramic Honeycomb:

An unplugged honeycomb body is a ceramic honeycomb that has at least one channel that is not plugged. As an illustration, the honeycomb may have one half of the channels plugged on one end and no plugs on the other end (i.e., half of the channels are unplugged).

The unplugged ceramic honeycomb may be green, calcined or sintered, but is preferred to be either green or calcined. A green unplugged ceramic honeycomb is comprised of ceramic powders and an organic binder. Organic binder includes those, as described in Chapter 11 of *Introduction to the Principles of Ceramic Processing*, J. Reed, John Wiley and Sons, NY, N.Y., 1988. A calcined unplugged ceramic honeycomb body is a green unplugged ceramic honeycomb that has been heated to a calcining temperature sufficient to remove the organic binder and dehydrate any clay that may be present. A sintered unplugged ceramic honeycomb is a green or calcined unplugged ceramic honeycomb that has been heated to a sintering temperature sufficient to fuse (sinter) the ceramic constituents into a monolithic ceramic.

Plugged Ceramic Honeycomb:

A plugged ceramic honeycomb is any of the aforementioned unplugged ceramic honeycombs that have at least one channel plugged with a mixture that forms a sintered ceramic plug upon heating to a sintering temperature, thus forming a sintered plugged ceramic honeycomb.

Sintered Plugged Ceramic Honeycomb:

A plugged ceramic honeycomb that is heated to a sintering temperature sufficient to fuse (sinter) the ceramic constituents of the plug and, if necessary, the ceramic honeycomb into a monolithic ceramic.

DETAILED DESCRIPTION OF THE INVENTION

The Ceramic Honeycomb Wall-Flow Filter

Figure 2:
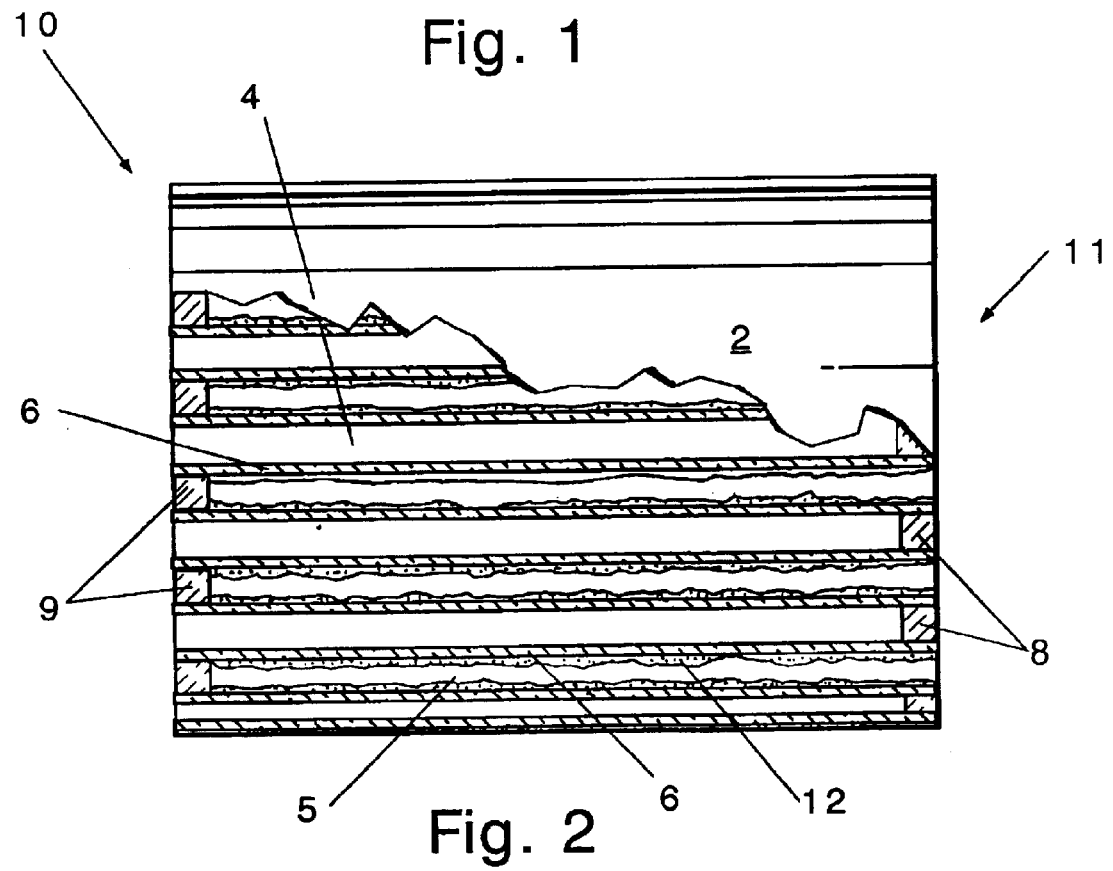
FIG. 2 is a side view of FIG. 1 with a part thereof cut away.
Figure 3:
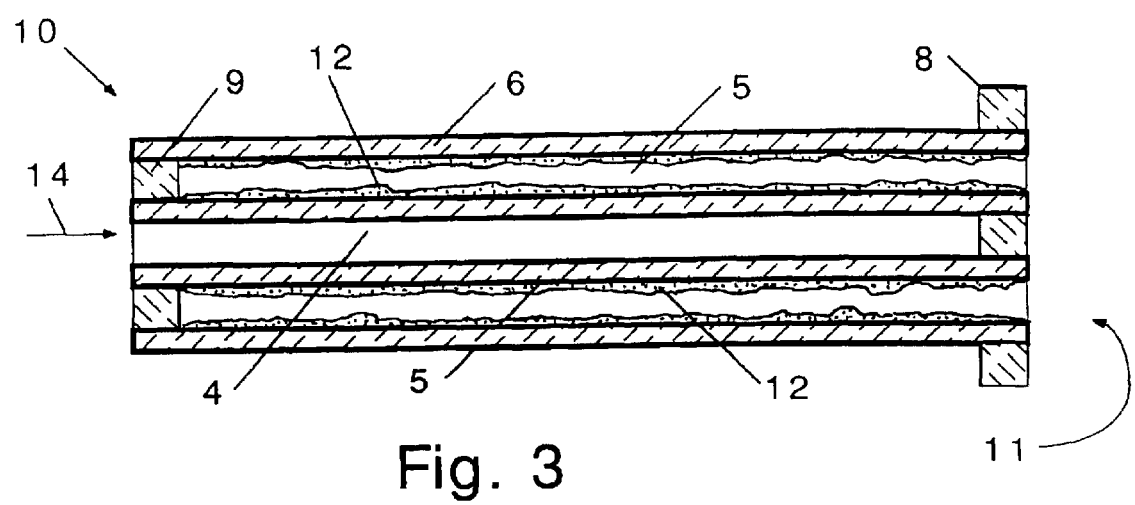
FIG. 3 is an enlarged schematic view of adjacent channels in the filter of FIG. 1.
Figure 4:
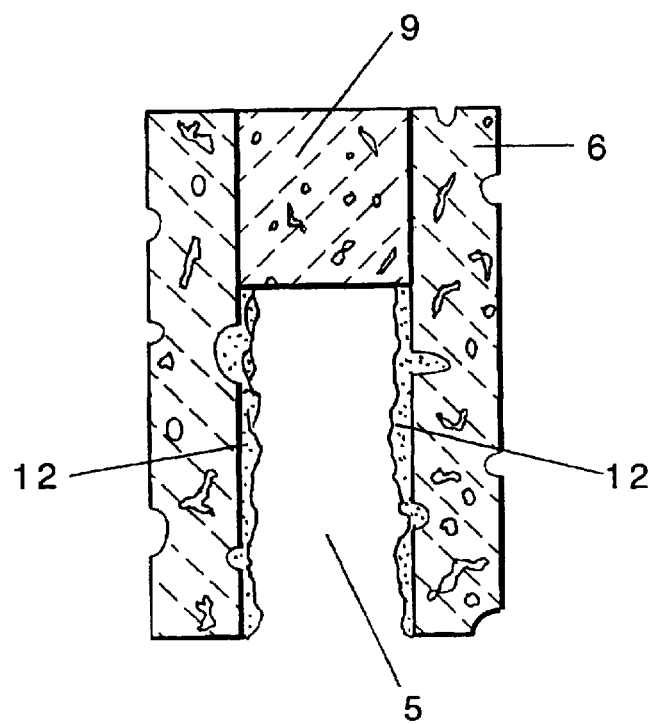
FIG. 4 is an enlarged cross-sectional view of a plugged portion of a channel and in-situ formed discriminating layer of the filter of FIG. 1.

Referring to FIG. 1 through FIG. 4, which depicts one preferred embodiment of the ceramic honeycomb filter 5 comprising a ceramic honeycomb body 2 that has a plurality of parallel inlet and outlet channels 4 and 5, respectively, extending there through (i.e., from inlet end 10 to outlet end 11), defined by porous partition walls 6, inlet channel plugs 8 and outlet channel plugs 9. The outlet channels 9 also have disposed on the surface of the partition walls 6 a discriminating layer 12. When a gas or liquid 14 containing matter to be filtered is directed into inlet channels 4, the gas or liquid 14 passes through the partition walls 6 and discriminating layer 12 and exits the outlet channels 5. Thus, the partition walls 6 and discriminating layer 12 filter out the matter from the gas or liquid 14.

The ceramic honeycomb body 2 may be any useful ceramic that has sufficient porosity and strength to perform as a wall-flow filter. Examples of useful ceramics include silicon carbide, silicon nitride, mullite, cordierite, beta spodumene, phosphate ceramics (e.g., zirconium phosphate) or combinations thereof. Preferably, the ceramic is mullite, silicon carbide or cordierite. More preferably, the ceramic is mullite or silicon carbide. The mullite is preferably one that is formed in the presence of a fluorine gas, such as those described in U.S. Pat. Nos. 4,910,172; 4,911,902; 4,948,766; 5,098,455; 5,173,349; 5,194,154; 5,198,007; 5,252,272 and 5,340,516, each incorporated herein by reference. The grains of the mullite preferably have an average aspect ratio of at least 2, more preferably at least about 5, and most preferably at least about 10.

Generally, the porosity of the ceramic honeycomb body 2 is from about 30 percent to about 80 percent porous. Preferably, the ceramic honeycomb body 2 is about 40 percent to 70 percent porous. The plugs 8 and 9 may be any porosity sufficient to act effectively as a plug. Generally, the plugs 8 and 9 may be any ceramic composition including essentially the same ceramic composition as the ceramic honeycomb body 2. Essentially the same composition means the plugs 8 and/or 9 have essentially the same chemistry and microstructure as the ceramic honeycomb body 2. Examples of plug compositions include the same ceramics, as previously described, for the ceramic honeycomb body 2.

In one preferred embodiment of the ceramic wall-flow filter, the plug or plugs 8 and 9 have the same composition as the ceramic honeycomb body 2. In this embodiment, there may or may not be a discriminating layer 12. Preferably, there is a discriminating layer 12 that has essentially the same chemistry as the ceramic honeycomb body.

In another preferred embodiment, the sintered ceramic honeycomb body 2 has an inlet plug 8 at the outlet end 11 that has a different composition than an outlet plug 9 at the inlet end 10. Different composition means that, after sintering, the compositions have a readily discernable microstructural difference (e.g., porosity, crystalline structure or grain size) or chemical difference by typically employed techniques for characterizing ceramics. Essentially this means that the differences are not readily discernable by the aforementioned techniques. Preferably, one half of all of the channels of the honeycomb body 2 (i.e., the inlet channels 4) are plugged at one end and the remaining channels not plugged on the one end are plugged at the other end (i.e., outlet channels 5 are plugged at the inlet end). Even more preferably, the outlet plugs 9 have essentially the same chemistry but different microstucture than inlet plugs 8. It is, further, preferred that this embodiment also have a discriminating layer 12. Most preferably, the outlet plugs 9 have essentially the same composition as the discriminating layer 12 and the inlet plugs 8 have essentially the same composition as the ceramic honeycomb body 2.

The discriminating layer 12 may be any material useful for making a filter, so long as the average pore size of the discriminating layer 12 is substantially less than the average pore size of the ceramic honeycomb body. Suitable materials include those described for the ceramic honeycomb body. "Substantially less" generally means that the discriminating layer average pore size is at most about three quarter the average pore size of the ceramic honeycomb body. Preferably, the average pore size of the discriminating layer 12 is at most about one half and more preferably, at most about one quarter the average pore size of the ceramic honeycomb body 2.

In addition, the ceramic honeycomb wall-flow filter 1 may have a catalyst on or within at least one partition wall 6 or discriminating layer 12. The catalyst may be any catalyst suitable to catalyze, for example, the combustion of soot particles or oxidation of CO (carbon monoxide) or $NO_x$ (nitrogen oxides). Exemplary catalysts include the following.

A first exemplary catalyst is directly a bound-metal catalyst, such as noble metals, base metals and combinations thereof. Examples of noble metal catalysts include platinum, rhodium, palladium, ruthenium, rhenium, silver and alloys thereof. Examples of base metal catalysts include copper, chromium, iron, cobalt, nickel, zinc, manganese, vanadium, titanium, scandium and combinations thereof. The metal catalyst, preferably, is in the form of a metal, but may be present as an inorganic compound, such as an oxide, nitride and carbide, or as a defect structure within the ceramic grains of the porous catalyst support. The metal may be applied by any suitable technique, such as those known in the art. For example, the metal catalyst may be applied by chemical vapor deposition.

A second exemplary catalyst is one that is incorporated into the lattice structure of the ceramic grains of the aforementioned catalyst honeycomb. For example, an element may be Ce, Zr, La, Mg, Ca, a metal element described in the previous paragraph or combinations thereof. These elements may be incorporated in any suitable manner, such as those known in the art.

A third exemplary catalyst is a combination of ceramic particles having metal deposited thereon. These are typically referred to as wash-coats. Generally, wash-coats consist of micrometer-sized ceramic particles, such as zeolite, aluminosilicate, silica, ceria, zirconia, barium oxide, barium carbonate and alumina particles that have metal deposited thereon. The metal may be any previously described for directly deposited metal. A particularly preferred wash-coat catalyst coating is one comprised of alumina particles having a noble metal thereon. It is understood that the wash-coat may be comprised of more than one metal oxide, such as alumina, having oxides of at least one of zirconium, barium, lanthanum, magnesium and cerium.

A fourth exemplary catalyst is a perovskite-type catalyst comprising a metal oxide composition, such as those described by Golden in U.S. Pat. No. 5,939,354.

A fifth exemplary catalyst is one that is formed by and deposited on the catalyst support by calcining at a temperature of from about 300° C. to about 3000° C., a composition that comprises (a) an aqueous salt solution containing at least one metal salt and (b) an amphiphilic ethylene oxide containing copolymer, wherein the copolymer has an average molecular weight of greater than 400, an ethylene oxide content of 5 to 90 percent and an HLB of between −15 and 15, as described by Gruenbauer, et al., PCT Patent Application No. WO99/18809. In addition, the catalyst may also be one as described by U.S. Pat. No. 5,698,483 and PCT Patent Application No. WO99/03627.

Method of Forming a Ceramic Honeycomb Wall-Flow Filter

In performing the method of plugging channels in a ceramic honeycomb, a mixture comprised of a dispersing liquid and a ceramic powder is formed. The mixture is then inserted into at least one channel of an unplugged ceramic honeycomb, such that the mixture flows to the other end where the mixture collects and forms a plugged ceramic honeycomb. The plugged ceramic honeycomb is then heated to a temperature sufficient to sinter the plugs and fuse them to the ceramic honeycomb and, if necessary, sinter the ceramic honeycomb too (i.e., sinter the ceramic honeycomb if it is a green or calcined ceramic honeycomb). In other words, the plugged ceramic honeycomb is heated sufficiently to form a porous sintered plugged ceramic honeycomb.

The mixture must be fluid enough to be inserted into one end of a channel of the green ceramic honeycomb and subsequently flow through the channel and collect at the other end of the channel, for example, from the mere exertion of gravity. Thus, the mixture may deposit, for example, a discriminating layer on the partition walls and form the inlet or outlet plug, after removing a sufficient amount of dispersing liquid to give the collected mixture enough integrity to form the plug. Generally, the viscosity of the mixture is at most about 1000 centipoise (cp), more preferably the mixture has a viscosity of at most about 200 cp, even more preferably at most about 100 cp and most preferably at most about 20 cp.

The mixture may be formed by any suitable method, such as those known in the art. Suitable methods include those described in Chapter 17 of *Introduction to the Principles of Ceramic Processing*, J. Reed, John Wiley and Sons, NY, 1988.

The dispersing liquid may be, for example, water, any organic liquid, such as an alcohol, aliphatic, glycol, ketone, ether, aldehyde, ester, aromatic, alkene, alkyne, carboxylic acid, carboxylic acid chloride, amide, amine, nitrile, nitro, sulfide, sulfoxide, sulfone, organometallic or mixtures thereof. Preferably, the dispersing liquid is water, an aliphatic, alkene or alcohol. More preferably, the liquid is an alcohol. Preferably, the alcohol is a methanol, propanol, ethanol or combinations thereof. Most preferably, the alcohol is propanol.

The ceramic powder may be any ceramic powder useful to form the plugs, such as ceramic powders that form ceramics, such as silicon carbide, silicon nitride, mullite, cordierite, beta spodumene, phosphate ceramics (e.g., zirconium phosphate) or combinations thereof. Preferably, the ceramic powders form mullite or cordierite. Preferred examples of ceramics include silica, silicon carbide, alumina, aluminum fluoride, clay, fluorotopaz, zeolite, and mixtures thereof. More preferably, the ceramic powder is comprised of powders that form fluorotopaz and mullite in a process that has fluorine gas present at some time in the process, as previously described.

The mixture may contain other useful components, such as those known in the art of making ceramic suspensions. Examples of other useful components include dispersants, deflocculants, flocculants, plasticizers, defoamers, lubricants and preservatives, such as those described in Chapters 10–12 of *Introduction to the Principles of Ceramic Processing*, J. Reed, John Wiley and Sons, NY, 1988. A preferred binder in the mixture is one that is soluble in the dispersing liquid, but not soluble in water.

The mixture may also contain binders. Examples of binders include cellulose ethers, such as those described in Chapter 11 of *Introduction to the Principles of Ceramic Processing*, J. Reed, John Wiley and Sons, NY, N.Y., 1988. Preferably, the binder is a methylcellulose or ethylcellulose, such as those available from The Dow Chemical Company under the trademarks METHOCEL and ETHOCEL. Preferably, the binder dissolves in the dispersing liquid, but not water, such as ETHOCEL.

After forming the mixture, it is inserted into a channel of an unplugged ceramic honeycomb to form plugs (i.e., form a plugged ceramic honeycomb). Insertion into a channel may be accomplished by any suitable method, such as those known in the art. For example, the mixture may be poured, squirted or injected into the channel.

The dispersing liquid may be removed by any suitable method, such as by drying in air, drying by application of heat or vacuum, or by removing it by blocking the channel ends on one end of the ceramic honeycomb body with a porous medium that removes the dispersing liquid by capillary action. An example of such a porous medium is plaster of Paris, such as that used in slip casting ceramics. It is particularly preferred to seal off the channels to be plugged, such that when pouring the mixture into all of the channels on one end, the fluid flows through all of the channels and collects only at the sealed channels of the other end to form the plugs, whereas the unsealed channels allow the mixture to exit without forming plugs.

In another preferred embodiment, the unplugged ceramic honeycomb has at least one plug in a channel on one end and at least one channel that has no plugs (i.e., open channel). Subsequently, the mixture is inserted into the open channel. The mixture is inserted in the open channel on the same end as the plug in the plugged channel, such that the mixture flows down the open channel and forms a plug in the open channel at the other end of the honeycomb.

After insertion of the mixture (i.e., formation of the plugged ceramic honeycomb), the plugged ceramic honeycomb is heated to a sintering temperature sufficient to sinter the plugs and, if necessary, sinter the ceramic honeycomb to form the plugged sintered ceramic honeycomb. In general, the plugged sintered ceramic honeycomb is from about 30 percent to about 80 percent porous and, preferably, from about 40 percent to about 70 percent porous.

The sintering temperature is dependent on the ceramic to be formed but, in general, is at least about 900° C. Preferably, the sintering temperature is at least about 1000° C. and more preferably, at least about 1100° C. to preferably, at most about 2200° C., more preferably, at most about 1750° C. and most preferably, at most about 1400° C. The heating to the sintering temperature may be carried out in any suitable manner or heating apparatus and under any suitable atmosphere or combinations of atmospheres, such as those known in the art for making the particular sintered ceramic desired.

In performing the method, an unplugged ceramic honeycomb that has been calcined may be used. Generally, the calcining temperature is insufficient to substantially sinter the green ceramic honeycomb, but is sufficient to remove any organic binders and dehydrate any clay, such that the dehydrated clay substantially fails to be rehydrated when contacted with water.

The calcining temperature may be any temperature suitable to substantially remove any organic binders or dehydrate any clay present in the honeycomb. Generally, if there is a clay present, the temperature should be sufficient to cause the clay to substantially fail to rehydrate. "Substantially fail to rehydrate" is generally when about 90 percent by weight of the clay fail to rehydrate when placed in water for 24 hours. Preferably, the calcining temperature is great enough that 99 percent and more preferably, all of the dehydrated clay fails to rehydrate when placed in water.

Generally, the calcining temperature is from about 400° C. to at most about 1000° C. More preferably, the calcining temperature is at least about 500, more preferably at least about 600, most preferably at least about 650 to preferably at most about 950, more preferably at most about 900, and most preferably at most about 850° C.

The calcining atmosphere may be any atmosphere suitable for dehydrating the clay or both. Examples include air, vacuum, inert atmospheres (e.g., noble gases), nitrogen or combinations thereof. The method and apparatus for heating to the calcining temperature may be any suitable apparatus, such as those known in the art.

The plugged calcined ceramic honeycomb is then sintered in the same manner as previously described to form the sintered plugged ceramic honeycomb.

Finally, an unplugged sintered ceramic honeycomb may also be used. The unplugged sintered ceramic honeycomb may be made by any suitable method. For example, the sintering may be the same as described for sintering the plugs. After the plugs are inserted, the plugs are sintered as described previously to form the porous sintered plugged ceramic honeycomb.

EXAMPLES

Example 1

A 37.2 cells per cm$^2$ green honeycomb was made by extruding and drying a pasty mixture of alumina, clay, binders and water at Advanced Ceramics Incorporated (Atlanta, Ga.). The green honeycomb was cut to a length of about 150 mm. Half the channels on one end of the green honeycomb were plugged with the same pasty mixture used to make the honeycomb so as to form a checkerboard pattern of plugs on this end (first plugged end). The honeycomb was placed in a clamp with the first plugged end facing up (i.e., the other or second end was facing down).

Mullite powder (Baikalox MULCR, Baikowski International, Charlotte, N.C.), having an average particle size of about 3 micrometers was mixed with 2 propanol and about 3 percent by weight of ethyl cellulose (ETHOCEL, The Dow Chemical, Midland, Mich.) to form a slurry having about 10 percent by weight mullite. The slurry was fluid and easily poured. The slurry was then poured into the unplugged channels of the first plugged end. The slurry flowed into and down the channels, coating the walls of the channels and collecting at the other end of the honeycomb. The slurry collected at the second end and formed a checkerboard pattern of plugs due to capillary action in the channels not plugged in the first plugged end, to form a plugged green honeycomb filter.

After drying, the plugged green honeycomb filter was heated to about 1000° C. to remove the binders and lightly sinter the oxides. The lightly sintered honeycomb was then converted to acicular mullite using the process described by Moyer, et al., U.S. Pat. No. 5,198,007. The resultant honeycomb wall-flow filter had a discriminating layer of fine needles of mullite where the mullite slurry contacted the walls of the honeycomb. The plugs on the first end had essentially the same mullite microstructure as the honeycomb, whereas the plugs on the second end had a mullite microstructure resembling the discriminating layer.

Example 2

A green honeycomb plugged on one end was prepared by the same method above. The green honeycomb plugged on one end was then heated to 1000° C. to remove the binders and lightly sinter the oxides.

The same mullite powder of Example 1 was mixed with a 4 weight percent solution of METHOCEL in water to form a slurry having about 10 percent by weight mullite. The slurry was poured down the open channels of the first end in the same manner as Example 1 to form plugs at the second end. After drying, the honeycomb was heated to about 600° C. to remove the METHOCEL binder from the plugs at the second end. After this, the plugged honeycomb was converted to acicular mullite using the process described by Moyer, et al., U.S. Pat. No. 5,198,007. The resultant honeycomb wall-flow filter had essentially the same microstructure characteristics as the filter in Example 1.

What is claimed is:

1. A method of plugging channels in a ceramic honeycomb to form a wall-flow filter comprising;
   (a) forming a mixture comprised of a dispersing liquid, a catalyst and ceramic powder,
   (b) inserting the mixture at one end of the channel in an unplugged ceramic honeycomb, such that the mixture flows to the other end where the mixture collects and forms a plugged ceramic honeycomb and
   (c) heating the plugged ceramic honeycomb to a temperature sufficient to sinter the plugged ceramic honeycomb to form the wall-flow filter.

2. The method of claim 1 wherein the dispersing liquid is water or an alcohol.

3. The method of claim 2 wherein the dispersing liquid is methanol, propanol, ethanol or mixtures thereof.

4. The method of claim 3 wherein the dispersing liquid is propanol.

5. The method of claim 1 wherein inserting of the mixture is performed by inserting the mixture at one end of the channel in the green ceramic honeycomb and allowing the mixture to flow to the other end, which is blocked, such that the mixture collects and forms a plug.

6. The method of claim 5 wherein the other end is blocked by a porous body capable of removing the dispersing liquid of the mixture.

7. The method of claim 5 wherein the mixture, as it flows through the channel, deposits ceramic powder on a wall of the channel, such that upon heating of step (c) a discriminating layer is formed on the wall of the channel.

8. A method of forming a ceramic honeycomb wall-flow filter comprising;
   (a) plugging, with a ceramic composition, at least one channel on a first end of an unplugged ceramic honeycomb to form a ceramic honeycomb plugged on the first end such that there is at least one adjacent channel that is unplugged on the first end,
   (b) forming a mixture comprised of a dispersing liquid and ceramic powder,
   (c) inserting the mixture into at least one of the adjacent channels that are unplugged on the first end such that the mixture flows to the other end where the mixture collects and forms a plug at the other end opposite the first end to form a honeycomb plugged at the first and other end, and
   (d) heating the honeycomb plugged at the first and other end to a temperature sufficient to sinter the honeycomb plugged at the first end and opposite end to form the ceramic wall-flow filter.

9. The method of claim 8 wherein the dispersing liquid is water or an alcohol.

10. The method of claim 9 wherein the dispersing liquid is methanol, propanol, ethanol or mixtures thereof.

11. The method of claim 10 wherein the dispersing liquid is propanol.

12. The method of claim 8 wherein inserting of the mixture is performed by inserting the mixture at first end of the channel in the green ceramic honeycomb and allowing the mixture to flow to the other end, which is blocked, such that the mixture collects and forms a plug.

13. The method of claim 12 wherein the other end is blocked by a porous body capable of removing the dispersing liquid of the mixture.

14. The method of claim 12 wherein the mixture, as it flows through the channel, deposits ceramic powder on a wall of the channel, such that upon heating of step (c) a discriminating layer is formed on the wall of the channel.

15. The method of claim 8 wherein the mixture contains a catalyst.

16. The method of claim 8 wherein half of the channels on the first end are plugged in a checkerboard pattern and upon inserting of the mixture a checkerboard pattern of plugs is formed at the other end.

17. The method of claim 8 wherein the ceramic composition of step (a) is a ceramic composition that is the same as that used to form the unplugged ceramic honeycomb.

18. A method of plugging channels in a ceramic honeycomb to form a wall-flow filter comprising;

(a) forming a mixture comprised of a dispersing liquid, and ceramic powder, (b) inserting the mixture at one end of the channel in an unplugged ceramic honeycomb, such that the mixture flows to the other end where the mixture collects and forms a plugged ceramic honeycomb, wherein the mixture, as it flows through the channel, deposits ceramic powder on a wall of the channel, such that upon heating of step (c) a discriminating layer is formed on the wall of the channel and (c) heating the plugged ceramic honeycomb to a temperature sufficient to sinter the plugged ceramic honeycomb to form the wall-flow filter.

\* \* \* \* \*